United States Patent [19]
Toda

[11] Patent Number: 6,131,916
[45] Date of Patent: Oct. 17, 2000

[54] CHUCK

[76] Inventor: Terasu Toda, 1566-2 Kitatahara-cho, Ikoma-shi Nara-ken, Japan, 630-0142

[21] Appl. No.: 09/338,662

[22] Filed: Jun. 23, 1999

[30] Foreign Application Priority Data

May 21, 1999 [JP] Japan ....................................... 140981

[51] Int. Cl.$^7$ .................................................. B23B 31/117
[52] U.S. Cl. ........................... 279/9.1; 279/102; 279/903; 29/446; 403/273; 409/234
[58] Field of Search ............................... 279/9.1, 96, 102, 279/103, 903; 409/234; 403/273, 361; 29/446

[56] References Cited

U.S. PATENT DOCUMENTS

| | | | |
|---|---|---|---|
| 4,657,454 | 4/1987 | Migita et al. ............................. | 409/234 |
| 5,158,408 | 10/1992 | Naito ........................................ | 409/234 |
| 5,311,654 | 5/1994 | Cook ........................................ | 29/447 |
| 5,582,494 | 12/1996 | Cook ........................................ | 409/234 |

FOREIGN PATENT DOCUMENTS 63-229205  9/1988  Japan ..................................... 279/903

*Primary Examiner*—Steven C. Bishop
*Attorney, Agent, or Firm*—Wenderoth, Lind & Ponack, L.L.P.

[57] ABSTRACT

A chuck comprises a mounting base 11, and a protruding shaft 12 protruding from a center of a front surface of the base and having a tapered surface 13 on the outer peripheral surface thereof. A hole 16 is formed in the protruding shaft and has an opened end surface, and the hole has holding portions 14 and pressure portions 15. The holding portions and the pressure portions are alternately arranged, and the holding portions are situated at a plurality of positions evenly spaced about an inner periphery of the shaft 12, and each of the holding portions has a short radius from the center of hole 16. The pressure portions are situated between the holding portions and have a long radius from the center of hole 16. A rotating cylinder 20 is detachably fitted outside the protruding shaft, and a group of rollers 21 is arranged inside the rotating cylinder that the axis of the group of rollers is aligned along the axis of the rotating cylinder and so that they are supported by appropriate means. The rotating cylinder is rotated, whereby the tool is held and removed.

10 Claims, 6 Drawing Sheets

CHUCK

BACKGROUND OF THE INVENTION

1. Field of the Invention

This invention relates to a chuck for holding various tools.

2. Description of the Related Art

The prior art of holding a cutting tool in a holder is that which comprises a shrink fitting method.

According to this shrink fitting method, a hole portion is expanded by heating, a proximal portion of the tool is fitted into this expanded hole, and then the hole portion is shrunk by cooling, whereby the tool is held in the hole. Thus, considerable time and labor are required for expansion and shrinkage, and the tool cannot be rapidly replaced.

The above-mentioned expansion and shrinkage method is therefore replaced by the method of holding the tool as described below. That is, as shown in FIG. 8, a hole 2 is formed inside an end surface of a tool holder 1. The hole 2 has a triangular shape having rounded corners in cross section perpendicular to an axis. This triangular shape with the rounded corners has a long radius and a short radius. The long radius extends from the center to the rounded corner located at the position where an inner periphery is trisected. The short radius extends from the center to the position where a distance between the rounded corners on the inner periphery is bisected.

To support a tool A in this holder 1, the hole portion 2 of the holder 1 is first inserted into the center of a pressurizing tool 3 as shown in FIG. 7.

In this case, as shown in FIG. 7, the rounded corners of the hole 2 are matched to pressurizing members 4 located at the positions where the pressurizing tool 3 is trisected.

Next, a handle 5 is rotated so that the pressurizing members 4 are slid toward the center as indicated by arrows of FIG. 8, while the rounded corners of the hole 2 are worked as shown in FIG. 9.

Consequently, the inner periphery of the triangular hole with the rounded corners shown in FIG. 8 is changed into the perfectly-circular hole 2 as shown in FIG. 9. The proximal portion of the tool A is inserted into this hole 2.

Then, the handle 5 is rotated, whereby while the pressurizing members 4 are slid in the directions in which the pressurizing members 4 are separated from the center (in the directions of arrows of FIG. 10), the rounded corners of the hole 2 are depressurized.

As a result, the tool A is tightly held by the portions between the rounded corners on the inner periphery of the hole 2 restored to the original shape.

The holder 1 for the tool A is pulled out from the pressurizing tool 3, and then the holder 1 is held by a chuck (not shown) rotating together with a spindle.

According to the above-described method, the tool is replaced through the following procedure. The holder is removed from the chuck, the removed holder is set in the pressurizing tool, the tool is removed from the holder by operating the pressurizing tool, the tool is held by the empty holder, and then the holder removed from the pressurizing tool is held by the chuck. However, this Moreover, operating efficiency of a machine is reduced considerably due to the troublesome replacement.

This invention is therefore made so that the tool can be very rapidly replaced (attached and detached) with the tool attached to the spindle of a machine tool.

SUMMARY OF THE INVENTION

In order to solve the above problems, according to one aspect of this invention, there is provided a chuck which comprises a mounting base, and a protruding shaft protruding from a center of a front surface of the base and having a tapered surface on the outer peripheral surface thereof A hole is formed in the protruding shaft and has an opened end surface, and the hole has holding portions and pressure portions (portions to be pressurized). The holding portions and the pressure portions are alternately arranged, and the holding portions are situated at a plurality of positions equally spaced along an inner periphery of the protruding shaft. Each of the holding portions has a short radius from the center of the hole. The portions to be pressurized are situated between the holding portions and have a long radius from the center of the hole. A rotating cylinder is detachably fitted outside the protruding shaft, and a group of rollers are arranged inside the rotating cylinder so that the axis of the group of rollers is aligned along the axis of the rotating cylinder and supported by an appropriate means.

According to another aspect of this invention, the axis of the group of rollers may be inclined in one direction with respect to the axis of the rotating cylinder.

DETAILED DESCRIPTION OF THE PREFERRED EMBODIMENTS

Embodiments of this invention will be described with reference to the accompanying drawings.

Figure 1:
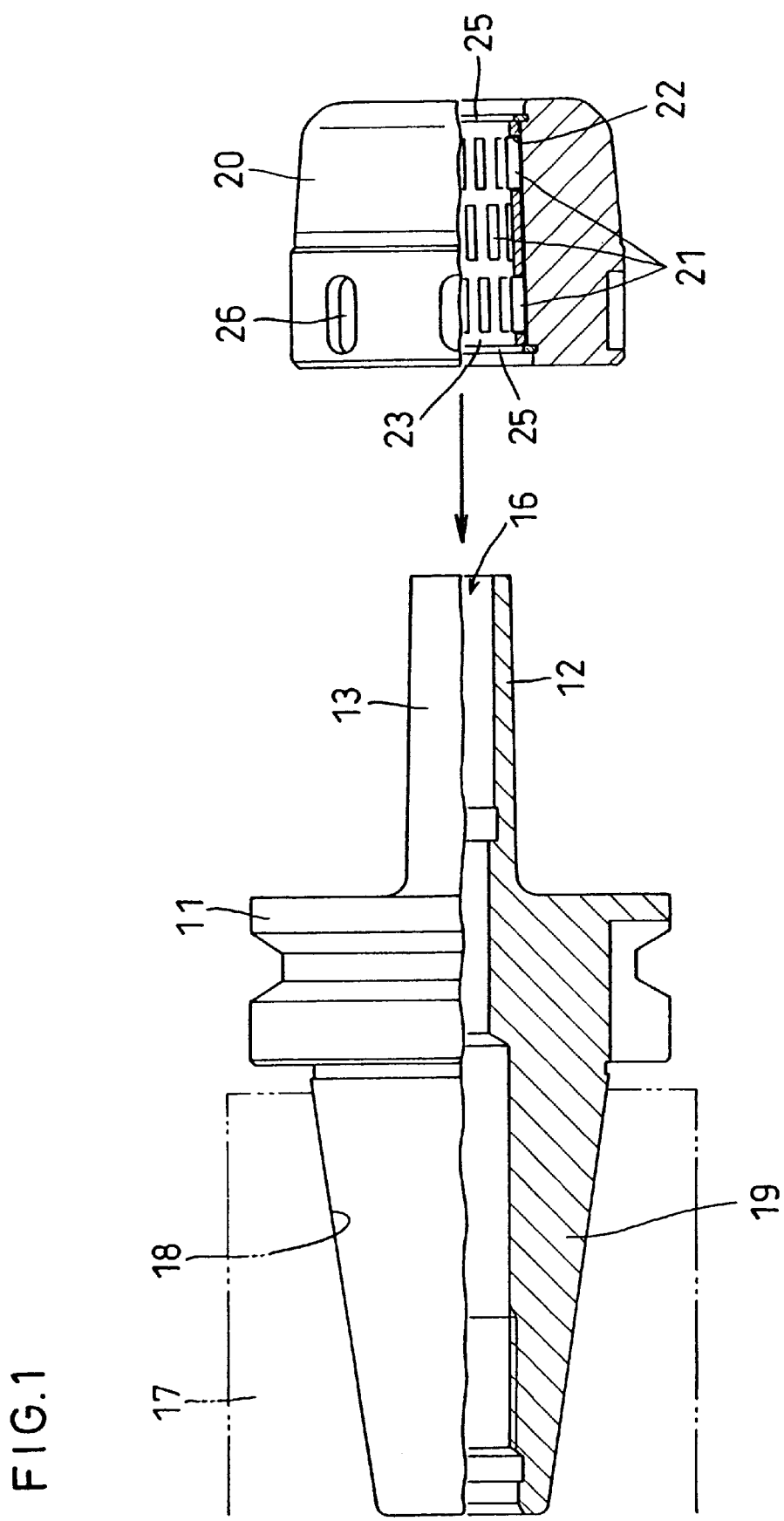
FIG. 1 is a partly cutaway side view of a first embodiment of a chuck according to this invention.
Figure 2:
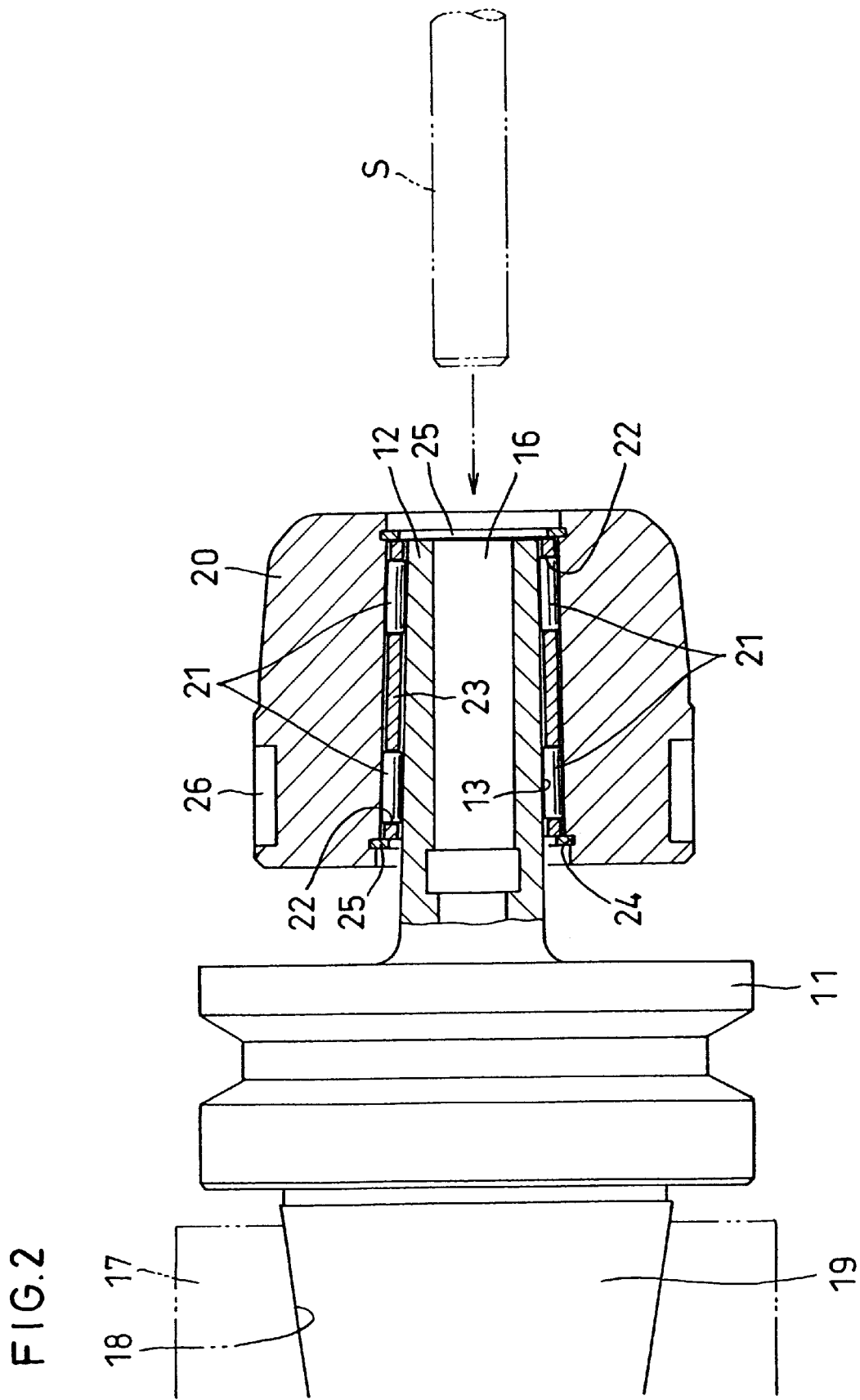
FIG. 2 is a vertical enlarged side view of a principal part of the first embodiment.
Figure 3:
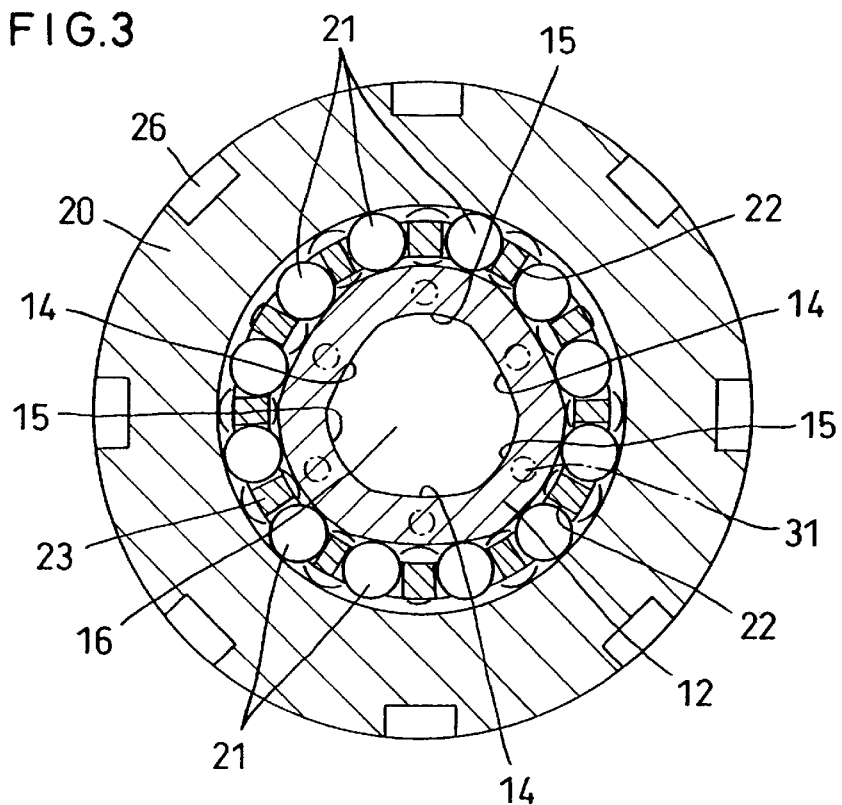
FIG. 3 is a vertical front view of a state in which a tool is held.

In a first embodiment of this invention, as shown in FIGS. 1 to 3, a shaft 12 protruding frontward is disposed in the center of a front surface of a mounting base 11. A tapered surface 13 is formed on an outer peripheral surface of the protruding shaft 12.

The protruding shaft 12 has a hole 16 whose front end surface is opened. The hole 16 has holding portions 14 and pressure portions 15 (which are portions to be pressurized), and the portions 14 and 15 are alternately arranged. The holding portions 14 are situated at a plurality of positions into which an inner periphery is equally divided (the positions where the inner periphery is trisected in the drawing) and have a short radius from the center of the hole 16. In other words, the holding portions are arranged so as to be evenly spaced about the inner periphery of the protruding shaft 12 (periphery of hole 16). The portions 15 to be pressurized are situated between the holding portions 14 and have a long radius from the center of hole 16.

A material having a high expansion coefficient is used for the protruding shaft 12. When the hole 16 is not pressurized from an outer periphery, the hole 16, which has the holding portions 14 and the pressure portions 15 alternating with each other and differing in radius size, has a triangular cross sectional shape with rounded corners (taken perpendicular to an axis, as shown in FIG. 3).

The base 11 is attached in the following manner. As shown in FIGS. 1 and 2, a taper shank 19 protruding from a distal end of the base 11 is fitted into a taper bore 18 of a rotating spindle 17 so that the protruding shaft 12 is rotated together with the spindle 17. However, the protruding shaft 12 and the spindle 17 may be rotated together by a method of holding the base 11 by a chuck, or the like. Alternatively, the base 11 with the protruding shaft 12 may be fixed so that the protruding shaft 12 and the spindle 17 are not rotated.

A rotating cylinder 20 is fitted outside the protruding shaft 12 in such a manner that the rotating cylinder 20 can be attached and detached (pulled out and inserted). A group of rollers 21 is disposed in the rotating cylinder 20 and supported by an appropriate arrangement such that the axis of each of the rollers of the group of rollers 21 is parallel to the axis of the rotating cylinder 20.

In the drawing, the group of rollers 21 is arranged in three arrays between both of the ends inside the rotating cylinder 20. Each roller 21 is rotatably fitted into a holder 23 so that the roller 21 does not drop into a through window 22. The holder 23 is engaged with a separate ring 25 which is fitted into and engaged with a circular groove 24 formed on both longitudinal ends of an inner peripheral surface of the rotating cylinder 20. Thus, the holder 23 is held in the rotating cylinder 20.

With the above-described constitution, the rotating cylinder 20 is fitted outside the protruding shaft 12. The fitted rotating cylinder 20 is rotated by using a tool. This rotation is achieved when an edge protrusion of an arc connecting to a grip of a tool is fitted into and engaged with a recess 26 of the outer peripheral surface of the rotating cylinder 20. The rotating cylinder 20 is moved toward the front surface of the base 11 (i.e., from the short diameter portion of the tapered surface 13 to the long diameter portion thereof).

As the rotating cylinder 20 is rotated and moved, the pressure portions 15 are pressed and constricted by the rollers 21 which are in peripheral contact with the outer peripheral surf ace of the protruding shaft 12. Thus, the holding portions 14 are expanded (released) in the circumferential direction due to the pressing and constriction of the pressure portions 15.

Figure 4:
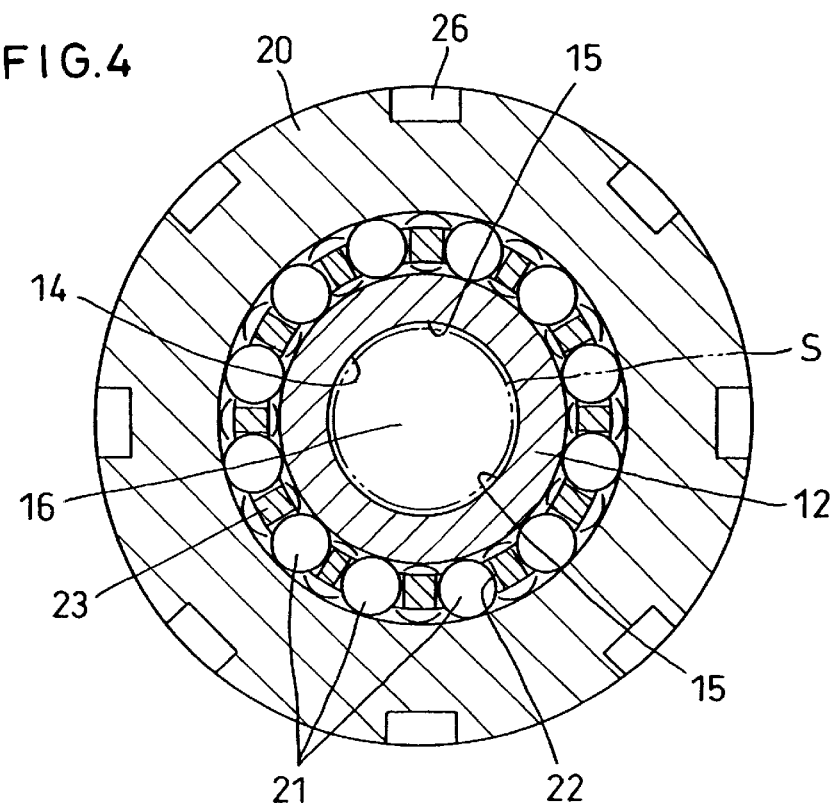
FIG. 4 is a vertical front view of a state in which the tool is released.

As a result, an irregular shape of the hole 16 shown in FIG. 3 is changed into a perfect circle as shown in FIG. 4. A proximal portion of a tool S is inserted into the perfectly-circular hole 16.

In this manner, the rotating cylinder 20 is rotated and moved from the long diameter portion to the short diameter portion of the tapered surface 13 of the protruding shaft 12.

Figure 5:
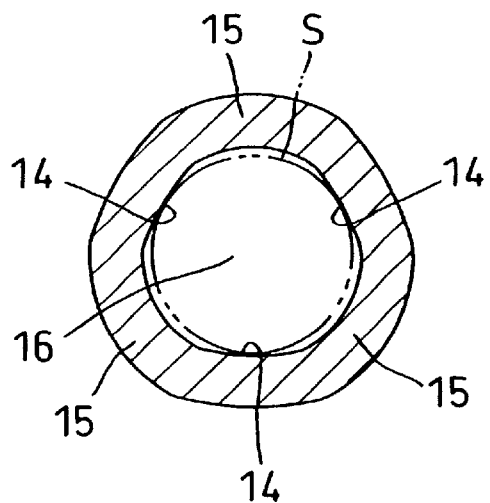
FIG. 5 is a vertical front view of a hole in the chuck of this invention.

Consequently, the group of rollers 21 stops pressurizing the pressure portions 15. Thus, the holding portions 14 are not expanded. The proximal portion of the tool S in the hole 16 is held by the holding portions 14, which are restored to the original shape as shown in FIG. 5. Of course, the rotating cylinder 20 is removed from the protruding shaft 12.

To remove the tool S from the protruding shaft 12, the rotating cylinder 20 is used.

Figure 6:
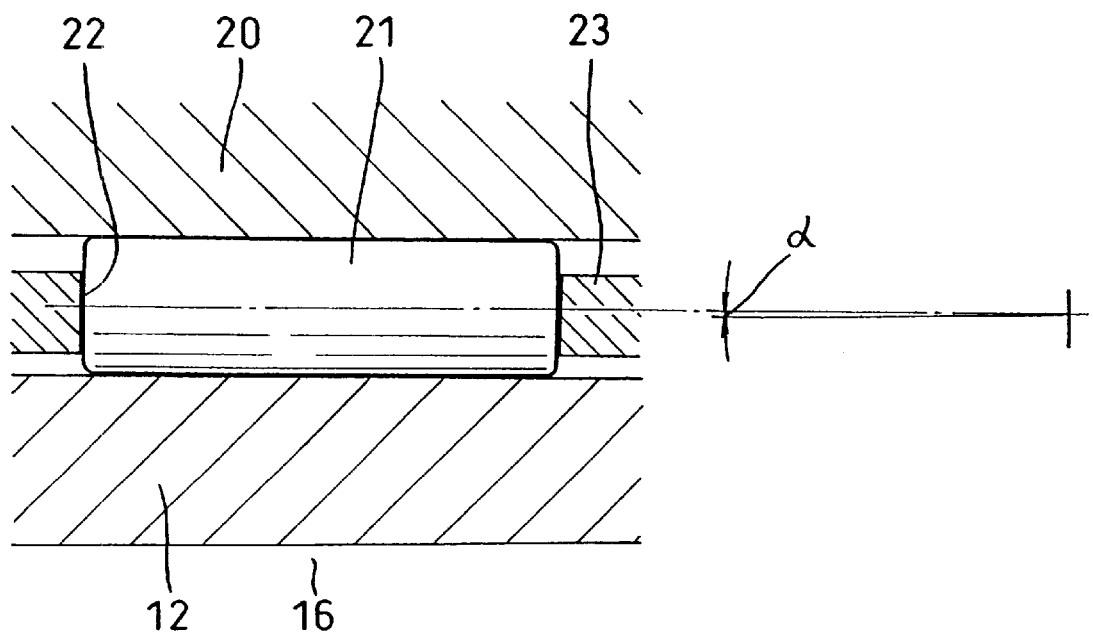
FIG. 6 is a vertical side view of a second embodiment of this invention.
Figure 7:
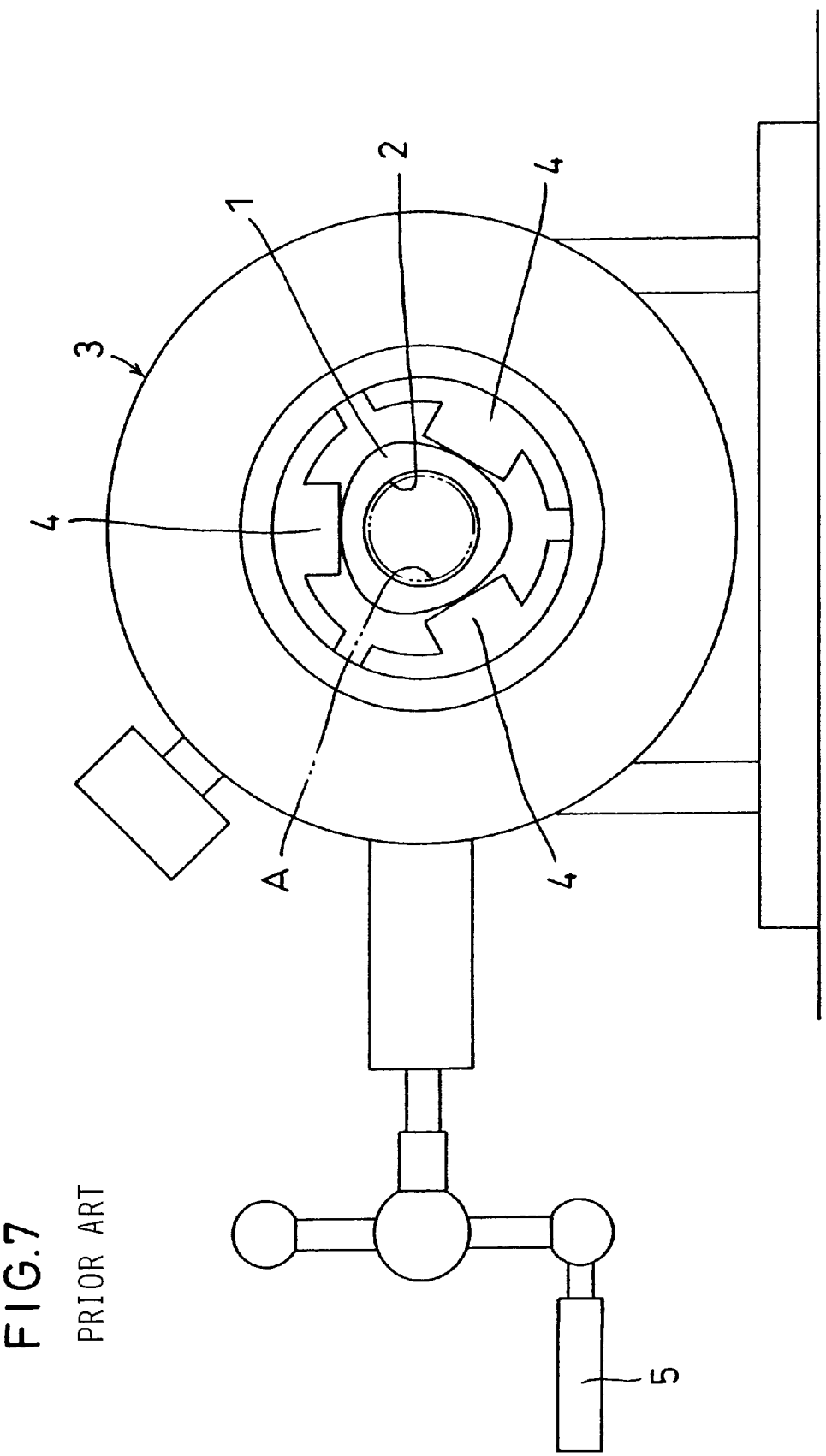
FIG. 7 is a front view of a tool holder and pressurizing tool of the prior art.
Figure 8:
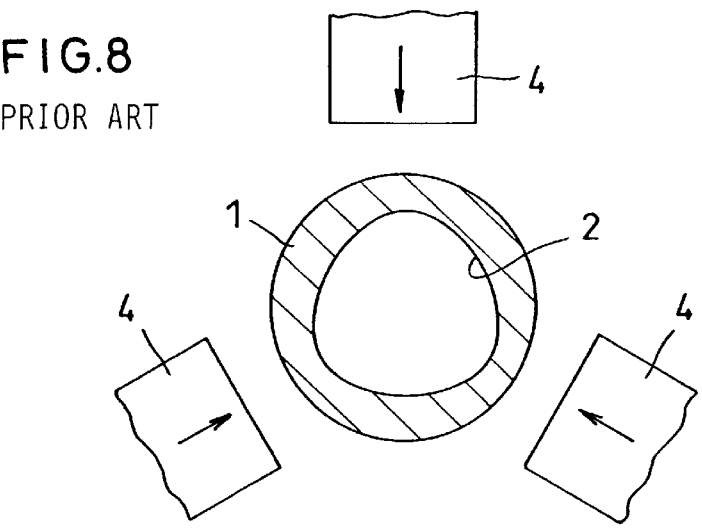
FIG. 8 is a functional view of a method of holding the tool in the tool holder of the prior art.
Figure 9:
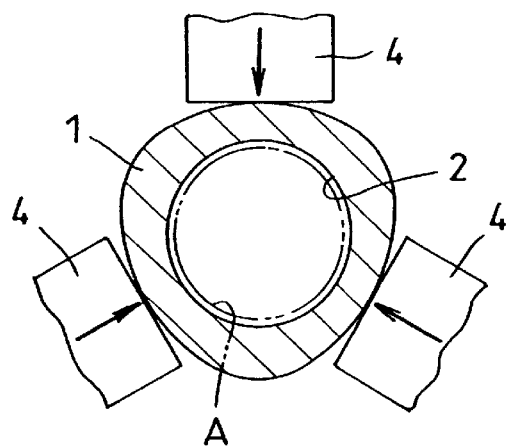
FIG. 9 is a functional view of a method of releasing the tool from the tool holder of the prior art.
Figure 10:
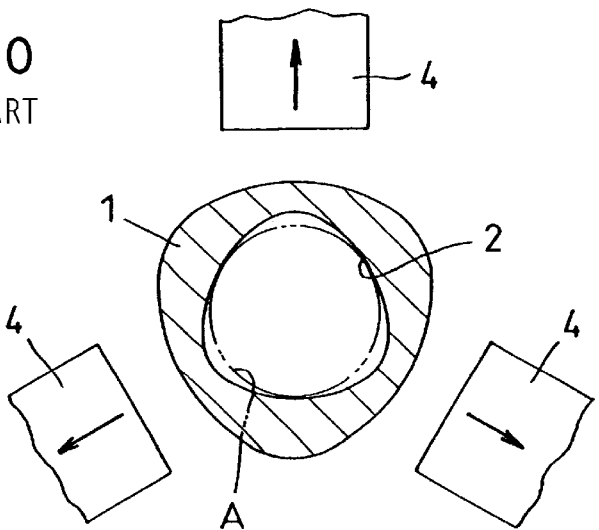
FIG. 10 is a functional view of a state in which the tool is held in the tool holder of the prior art.

In a second embodiment of this invention, the axis of each roller 21 is slightly inclined with respect to the axis of the rotating cylinder 20. In other words, the axis of each roller 21 obliquely crosses the axis of the rotating cylinder 20, as shown in FIG. 6. For example, an inclination angle a is set to 1° in the drawing.

As the rotating cylinder 20 is rotated in one direction, the rotating cylinder 20 is automatically moved toward the base 11 by the tapered surface 13 of the protruding shaft 12. As the rotating cylinder 20 is rotated in the other direction, the rotating cylinder 20 is automatically moved in the direction in which the protruding shaft 12 protrudes (i.e., away from the base 11). In FIG. 3, numeral 31 denotes through-holes for helping to change the shape of protruding shaft 12, and the through-holes 31 are formed in the portions 15 to be pressurized.

The chuck according to this invention is constituted as described above. Thus, the rotating cylinder is fitted to the protruding shaft and the rotating cylinder is rotated, whereby the tool can be held and removed.

Thus, it is possible to save the trouble of removing the chuck and the holder from a machine tool, carrying the removed chuck and holder to an installation place for an exclusive pressurizing tool, and then replacing (attaching and detaching) the tool. Moreover, it is not necessary to reattach the chuck and the holder to the machine tool after the replacement of the tool.

The axis of each of the rollers may also be inclined with respect to the axis of the protruding shaft. Thus, if the rotating cylinder is rotated in one direction, the rotating cylinder can be moved toward the base. Moreover, if the rotating cylinder is rotated in the other direction, the rotating cylinder can be moved in the direction in which the rotating cylinder is separated from the base.

What is claimed is:

1. A chuck apparatus comprising:
    a mounting base having a front surface;
    a shaft protruding from a center of said front surface of said base, said shaft having a longitudinal axis, a base end connected to said base, a distal end opposite said base end, and a tapered outer peripheral surface;
    a hole formed in said shaft along said longitudinal axis of said shaft so as to form an inner peripheral surface of said shaft, said hole having an opening at said distal end of said shaft and being shaped such that holding portions and pressure portions are formed on said inner peripheral surface of said shaft, said holding portions being evenly spaced around said inner peripheral surface of said shaft and being located a first distance from a center of said hole, said pressure portions being evenly spaced around said inner peripheral surface of said shaft between said holding portions and being located a second distance from said center of said hole, said first distance being smaller than said second distance;
    a rotating cylinder having a longitudinal axis and being detachably fitted on said outer peripheral surface of said shaft, said rotating cylinder being removed from said shaft after mounting of a tool in said hole or removal of a tool from said hole; and
    a plurality of rollers arranged along an inner peripheral surface of said rotating cylinder, each of said rollers having an axis of rotation parallel with said longitudinal axis of said rotating cylinder.

2. The apparatus of claim 1, wherein said rotating cylinder includes a plurality of holders, wherein each of said rollers is supported along said inner peripheral surface of said rotating cylinder by one of said holders.

3. The apparatus of claim 1, wherein said shaft includes a plurality of through-holes between said inner peripheral surface and said outer peripheral surface of said shaft.

4. The apparatus of claim 3, wherein each of said through-holes is hollow.

5. The apparatus of claim 4, wherein said through-holes are located at said pressure portions of said shaft.

6. A chuck apparatus comprising:

a mounting base having a front surface;

a shaft protruding from a center of said front surface of said base, said shaft having a longitudinal axis, a base end connected to said base, a distal end opposite said base end, and a tapered outer peripheral surface;

a hole formed in said shaft along said longitudinal axis of said shaft so as to form an inner peripheral surface of said shaft, said hole having an opening at said distal end of said shaft and being shaped such that holding portions and pressure portions are formed on said inner peripheral surface of said shaft, said holding portions being evenly spaced around said inner peripheral surface of said shaft and being located a first distance from a center of said hole, said pressure portions being evenly spaced around said inner peripheral surface of said shaft between said holding portions and being located a second distance from said center of said hole, said first distance being smaller than said second distance;

a rotating cylinder having a longitudinal axis and being detachably fitted on said outer peripheral surface of said shaft, said rotating cylinder being removed from said shaft after mounting of a tool in said hole or removal of a tool from said hole; and a plurality of rollers arranged along an inner peripheral surface of said rotating cylinder, each of said rollers having an axis of rotation inclined with respect to said longitudinal axis of said rotating cylinder such that said axis of rotation of each of said rollers intersects said longitudinal axis of said rotating cylinder.

7. The apparatus of claim 6, wherein said rotating cylinder includes a plurality of holders, wherein each of said rollers is supported along said inner peripheral surface of said rotating cylinder by one of said holders.

8. The apparatus of claim 6, wherein said shaft includes a plurality of through-holes between said inner peripheral surface and said outer peripheral surface of said shaft.

9. The apparatus of claim 8, wherein each of said through-holes is hollow.

10. The apparatus of claim 9, wherein said through-holes are located at said pressure portions of said shaft.

\* \* \* \* \*